(12) United States Patent
Bruss et al.

(10) Patent No.: US 12,376,197 B2
(45) Date of Patent: Jul. 29, 2025

(54) EXTERIOR PANEL ASSEMBLY FOR A VEHICLE

(71) Applicant: SABIC GLOBAL TECHNOLOGIES B.V., Bergen op Zoom (NL)

(72) Inventors: Erhard Bruss, GA Geleen (NL); Ronald Van Der Wal, GA Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 911 days.

(21) Appl. No.: 17/296,139

(22) PCT Filed: Nov. 22, 2019

(86) PCT No.: PCT/EP2019/082265
§ 371 (c)(1),
(2) Date: May 21, 2021

(87) PCT Pub. No.: WO2020/104668
PCT Pub. Date: May 28, 2020

(65) Prior Publication Data
US 2022/0030671 A1   Jan. 27, 2022

(30) Foreign Application Priority Data

Nov. 22, 2018 (EP) .................................. 18207824

(51) Int. Cl.
*H05B 3/84* (2006.01)
*B60S 1/66* (2006.01)
*G02B 27/00* (2006.01)

(52) U.S. Cl.
CPC .................. *H05B 3/84* (2013.01); *B60S 1/66* (2013.01); *G02B 27/0006* (2013.01); *H05B 2203/032* (2013.01)

(58) Field of Classification Search
CPC ....... H05B 3/84; H05B 2203/032; B60S 1/66; G02B 27/0006
See application file for complete search history.

(56) References Cited

U.S. PATENT DOCUMENTS 10,827,564 B1 * 11/2020 Wilson .............. B32B 17/10174
2004/0070339 A1    4/2004 Suda et al.
(Continued)

FOREIGN PATENT DOCUMENTS

DE      102011001867 A1   10/2012
DE      102014110841 A1    2/2016
(Continued)

OTHER PUBLICATIONS

International Search Report and Written Opinion for International Application No. PCT/EP2019/082265; International Filing Date—Nov. 22, 2019; Date of Mailing—Oct. 2, 2020; 12 pages.

*Primary Examiner* — Tiffany T Tran
(74) *Attorney, Agent, or Firm* — CANTOR COLBURN LLP

(57) ABSTRACT

The invention relates to an exterior panel assembly for a vehicle, the assembly comprising a sheet having side edges, a first and second surface opposite of each other, and comprising a thermoplastic material, wherein the sheet is transparent to electromagnetic radiation in at least one of the ranges for radio waves, infrared radiation, visible light and ultraviolet radiation; a heating device comprising an infrared emitter for emitting infrared rays towards the sheet; and a housing structure for accommodating the heating device, wherein the housing structure opens up towards the sheet with an opening, and wherein the sheet extends over the opening of the housing structure. The inventor further relates to a vehicle comprising such an exterior panel assembly.

19 Claims, 2 Drawing Sheets

(56) References Cited

U.S. PATENT DOCUMENTS

2018/0284274 A1* 10/2018 LaChapelle ............. G01S 17/10
2020/0070783 A1* 3/2020 Hida ....................... F04B 53/16

FOREIGN PATENT DOCUMENTS

EP          0892209  A2    1/1999
JP         2008083298 A    4/2008

* cited by examiner

EXTERIOR PANEL ASSEMBLY FOR A VEHICLE

CROSS REFERENCE TO RELATED APPLICATIONS

This application is a National Stage application of PCT/EP2019/082265 filed Nov. 22, 2019. This application claims priority to EP Application Serial No. 18207824.6 filed Nov. 22, 2018, the entire contents of which are incorporated herein by reference.

BACKGROUND OF THE INVENTION

Field of the Invention

The present invention relates to an exterior panel assembly for a vehicle, comprising a front sheet and a carrier structure. Furthermore, the invention relates to a vehicle comprising such an exterior panel assembly.

Description of the Related Art

Transforming the automotive industry from manually driven to autonomously driven cars has numerous consequences for the exterior design of a car, or a motor vehicle in general, in particular to accommodate the necessary sensors and/or transmitters.

These electronic devices, e.g. sensors, detectors and transmitters, often combined in a single apparatus, are needed to assure a safe car behavior on the road, e.g. to allow sufficient room between subsequent vehicles or to assess whether an overhaul can be done safely. Nowadays, parking assistance is a great example of the use of automation for cars.

Water or ice can hamper the transmission of radiation to such an electronic device. Especially for devices used in visibility systems and for autonomous driving systems, signal loss due to water or dirt, either liquid or solid, must be prevented. Several solutions to defrost or defog the covers protecting these devices from the environment have been proposed, such as the use of conductive grid lines for heating the cover and to melt and/or dry the cover. Such grid lines are being used extensively for glass windows, but when thermoplastic materials are used (for reasons of light weighting and impact resistance), these grid lines can cause distortion due to inhomogeneous heating of the thermoplastic surface.

In addition, as the electronic devices insure the safety of the passengers/merchandise, those must be operational at any time during the driving. Therefore, the de-frosting and/or de-icing means must be proactive and not only reactive in order to block water or ice to hamper the transmission of radiation to such an electronic device. Such proactivity imply higher energy consumption, which can limit the range of electric vehicle.

It would therefore be desirable to provide an alternative means for de-frosting and/or de-icing of for autonomous-driving devices that alleviated at least some of the perceived inconveniences of the prior art.

BRIEF SUMMARY OF THE INVENTION

Disclosed herein is an exterior panel assembly for a vehicle, such as a bumper, fascia, cover or trim of a vehicle, including a front-end panel or smart bumper, or part thereof. According to the invention, there is provided an exterior panel assembly for a vehicle, the assembly comprising:

a safety device;
a sheet having side edges, a first and second surface opposite of each other, and comprising a thermoplastic material, wherein the sheet is translucent to electromagnetic radiation in at least one of the ranges for radio waves, infrared radiation, visible light and ultraviolet radiation,
the sheet has a specific wavelength band ($\Delta$) within the near infrared band (800 nm to 2000 nm) and excluding the wavelength band use by the safety device, in which the transmission is:
  equal to or lower than 50% when the sheet thickness is 1 mm,
  equal to or lower than 30% when the sheet thickness is 2 mm,
  equal to or lower than 20% when the sheet thickness is 3 mm, or
  equal to or lower than 10% when the sheet thickness is 4 mm;
a heating device comprising an infrared emitter configured to emit infrared rays towards the sheet with wavelength(s) within the specific wavelength band ($\Delta$) of the thermoplastic material; and
a housing structure for accommodating the heating device, wherein the housing structure opens up towards the sheet with an opening, and wherein the sheet extends over the opening of the housing structure.

The sheet can be a one-shot (1K), or two-shot (2K) moulded sheet, depending on the application and functionality of the assembly. The sheet is preferred to be at least be able to transmit infrared radiation, possibly with additional transmittance for visible light and/or radiowaves and ultraviolet waves. Transmittance can include translucency and transparency.

The exterior panel assembly can be used as exterior trimming for a vehicle, and is thus subject to environmental influences. The first surface of the sheet can thus be covered in damp due to rain or ice due to decreased temperatures. The heating device is directed towards the second surface of the sheet, and radiates infrared rays towards the second surface of the sheet in operation.

The sheet may comprise an uncoated single sheet of thermoplastic materials or a laminate with one or more layers on a substrate, such as a thermoplastic substrate with a protective coating or layer, or a co-extruded sheet comprising two or more co-extruded layers, or a combination thereof.

The sheet may comprise at least one of the following material a polycarbonate, poly(ether)imide, polystyrene, polyester and acrylates (such as poly(methyl methacrylate) (PMMA)), blends or copolymers thereof, either alone or in combination.

Preferentially, the sheet may comprise at least one of the following material:
Polycarbonate with a lowest near IR transmission at 1670 nm,
Polypropylene compound with a lowest near IR transmission at 1730 nm,
PMMA with a lowest near IR transmission at 1760 nm,
PVB with a lowest near IR transmission at 1800 nm, or/and
PUR with a lowest near IR transmission at 833 nm.

Preferably, the sheet comprises a hardcoat layer 102A on the first surface. The hardcoat layer 102A may comprise at least one of a silicone, a polyurethane, an acrylate, and a metal oxide. The sheet is translucent, preferably transparent, to electromagnetic radiation in at least one of the ranges for radio waves, infrared radiation, visible light and ultraviolet radiation. For example, the sheet may be optically transparent, i.e. transparent to visible light, and be translucent for at least one of radio waves, infrared radiation and ultraviolet radiation. Other combinations of translucency and/or transparency for at least two types of electromagnetic radiation are possible as well.

The housing structure is designed to accommodate the heating device and opens up towards the sheet. The heating device has an infrared emitter directed towards the sheet, and thus towards the opening of the housing structure. The sheet extends over the opening of the housing structure. The sheet may be adjacent or spaced apart from the opening of the housing structure, i.e. at a distance different from 0. Preferably, the sheet is adjacent the opening of the housing structure, such that the sheet closes the opening of the housing structure. Alternatively, a cover may close the opening. The cover may be adjacent to the sheet, or may be spaced apart from the sheet. The cover and sheet may form a localized laminate at the opening of the housing structure.

An emitting or radiating direction of the heating device has a perpendicular and/or a parallel component relative to the surface of the sheet. As such, the emitting direction of the heating device may be perpendicular to the surface of the sheet, i.e. at an angle of 90 degrees with the surface of the sheet, or have an angle with the surface of the sheet of 0 degrees up to 90 degrees, i.e. in a perpendicular fashion. Preferably, the angle between the direction of emittance and the sheet surface is between more than 0 degrees and 50 degrees, or from 10 degrees to 30 degrees, or from 40 degrees to less than 90 degrees.

To reduce the weight of the exterior panel assembly, the panel assembly may only comprise polymer material, including thermoplastic and thermoset polymer material.

The assembly may comprise a carrier structure with a base and a spacing structure to space apart the sheet and the base, wherein the first surface of the sheet faces away from the base. Preferably, the carrier structure comprises a thermoplastic material.

The carrier structure comprises a base and a spacing structure that spaces the base from the sheet. The heating device may be provided in the housing structure within the space that is formed by the sheet and the carrier structure. The heating device may be located adjacent or near (in the vicinity of) the sheet. The housing structure may form part of the carrier structure, and extends from the carrier structure towards the sheet. The housing structure may form a device-accommodating portion, for instance of the carrier structure, that allows the heating device to be integrated into the assembly. Preferably, the assembly comprises a further device-accommodating portion for integrating further devices into the assembly and/or wherein the housing structure integrates further devices into the assembly. For example, the panel comprises at least one of a sensor-accommodating portion, a light accommodating portion, a camera-accommodating portion, a display-accommodating portion, a receiver-accommodating portion, and a transmitter-accommodating portion.

The housing structure may further accommodate another device, in particular a safety device such as a sensor, a light, a camera and/or a transmitter, LIDAR. Several devices, including the heating device may be integrated in one structure. The heating device may be positioned neighbouring to the other device. Furthermore, two or more heating devices may be positioned close to the other device, for instance on opposite sides of the other device, or in a ring surrounding the other device.

The device-accommodating portion, including the housing structure, may extend to and open up towards the sheet. Preferably, the device-accommodation portion is at least partially enclosed and supported by the carrier structure. Alternatively, the device-accommodating portion may be provided at a surface of the base and/or at a rear exterior of the panel assembly.

The sheet may comprise a first portion having an electromagnetic radiation transmission for at least one of radio waves, infrared radiation, visible light and ultraviolet radiation, preferably for visible light, equal to or greater than 40%, or equal to or greater than 60%, preferably equal to or greater than 75%, more preferably equal to or greater than 88%, for visible light transmission measured in accordance with ASTM D1003-00. The sheet can have a portion that is at least translucent for visible light, preferably transparent to visible light.

Alternatively, or in addition, the sheet may comprise a second portion, wherein an electromagnetic radiation transmission for at least one of radio waves, infrared radiation, visible light and ultraviolet radiation, preferably for visible light, of the second portion is less than 40%, or equal to or less than 10%, preferably equal to or less than 1%, more preferably equal to or less than 0.1%, for visible light measured in accordance with ASTM D1003-00. The sheet can be translucent, i.e. have a visible light transmission of equal or greater than 40%, either partially or completely. The sheet can be opaque, i.e. have a visible light transmission of less than 40%, either partially or completely.

The infrared emitter for emitting infrared rays may be an IR LED or an IR laser.

Furthermore, the infrared emitter for emitting infrared rays may have a wavelength in the range of equal to or more than 800 nm, preferably a wavelength in the range of more than 1.600 nm and/or more than 2.000 nm and/or more than 2.800 nm. Preferably, the infrared emitter for emitting infrared rays has an intensity maximum in the wavelength range of 1.600 nm to 1.800 nm and/or in the wavelength range of 2.000 nm to 2.800 nm.

Preferentially, the infrared emitter may produce wavelength(s) within the specific wavelength band ($\Delta$) of the thermoplastic material. More preferentially, the infrared emitter may produce only wavelength(s) within the specific wavelength band ($\Delta$) of the thermoplastic material.

Matching the range of the IR emitter with the wavelength corresponding to lowest near IR transmission of the sheet is essential to the invention.

It allows to use less powerful IR emitter that the ones with a larger wavelength range and therefore prevent the energy waste, which will not the use to heat up the sheet to prevent the formation of fog or ice nor creating interference with the operation of the safety device.

Therefore, the use of such IR emitter is essential in an electric vehicle when power consumption management is a challenge in order to increase the autonomy of such vehicle.

In addition, a less powerful IR emitter is also safer for the eyes; in particular, in regard of the use of IR laser as IR light does not initiated the reflex to close the eyelid to human.

By nature, ice and water (including fog) absorb infrared radiation, leading to an increased efficiency of the exterior panel assembly when using infrared radiation for de-fogging or de-icing the sheet. A number of thermoplastic materials, such as polycarbonate, poly(ether)imide, polystyrene, polyester and acrylates, absorbs infrared waves from 1600 nm, typically up to 90% for certain wavelength ranges. The typical absorption curves for each of those thermoplastics has its own characteristic, but in general, the transmission of electromagnetic radiation drops for these materials at wavelengths above 1600 nm. Using the optical property of absorption of infrared radiation allows the sheet to increase in heat and speed up the de-fogging and/or de-icing, thus creating an improved solution for highly efficient, fast, homogeneous and invisible de-fogging/defrosting/de-icing of exterior panel assemblies. The absorption of infrared radiation can apply to both optically transparent, translucent, and opaque thermoplastics.

Furthermore, the invention relates to a vehicle comprising an exterior panel assembly as described above. The exterior panel assembly may form part of an exterior trimming of the vehicle, for instance as a front fascia. The exterior panel assembly can be part of the front fascia or the rear end of a vehicle. Further, a pair of headlights or taillights, respectively, or form a part of a headlight structure or taillight structure can flank it.

BRIEF DESCRIPTION OF THE DRAWINGS

The features and advantages of the invention will be further appreciated upon reference to the following drawings of a number of exemplary embodiments, in which.

DESCRIPTION OF ILLUSTRATIVE EMBODIMENTS

Figure 1:
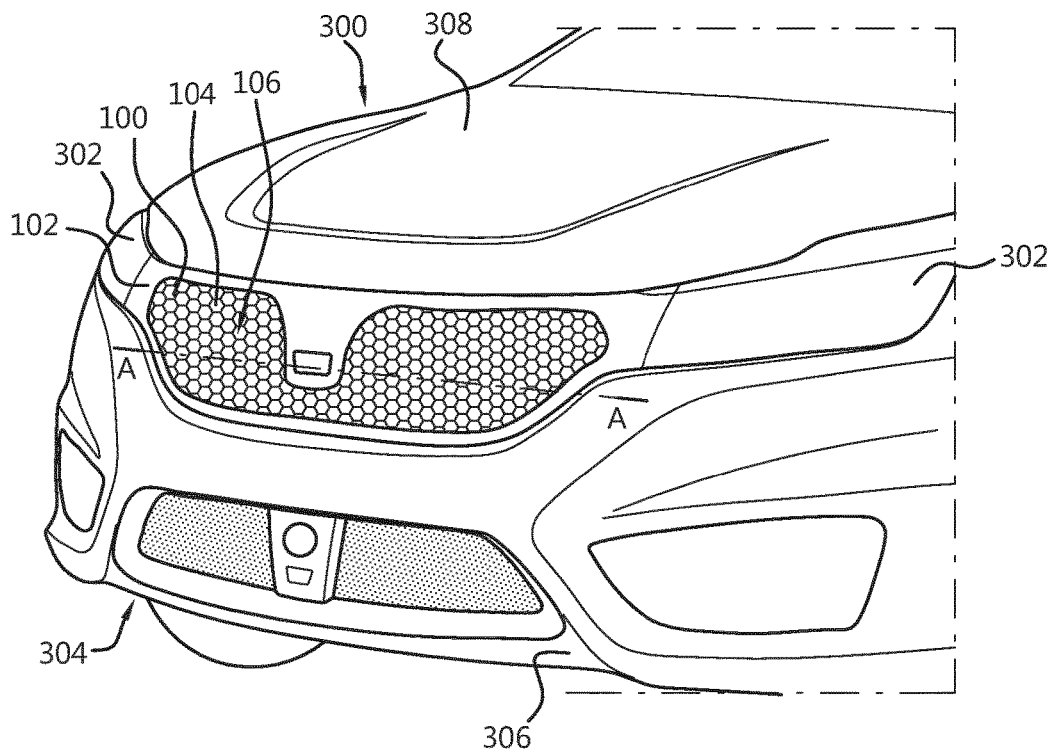
FIG. 1 shows an exterior panel assembly according to an embodiment of the present invention in perspective view.

FIG. 1 shows an exterior panel assembly 100 according to the present invention in perspective view, here executed as a front-end panel assembly. The exterior panel assembly 100 is provided as a component of a front fascia 304 of a vehicle 300. The exterior panel assembly 100 comprises a sheet 108 (see FIG. 2) at its front. The exterior panel assembly is located between a pair of headlights 302 at its sides. At its top end, the hood 308 of the vehicle is located; at its bottom end a bumper assembly 306 of the vehicle is provided.

Figure 2:
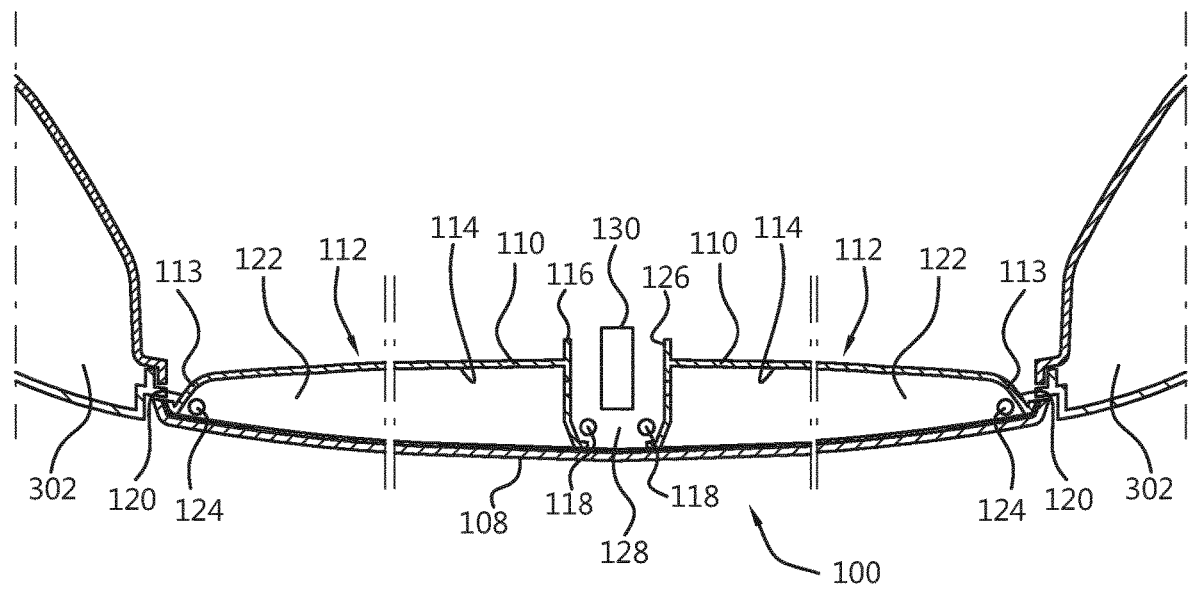
FIG. 2 shows a cross section along A-A of the exterior panel assembly of FIG. 1.

FIG. 2 shows a cross section along A-A of the front end panel assembly of FIG. 1. The exterior panel assembly or front-end panel assembly 100 is shown to have a sheet 108 that is located at the front end of the vehicle front fascia, see also FIG. 1a, in between the head light assemblies 302. The external surface of the sheet 108 comprises one or more protective layers to protect the sheet, in particular its thermoplastic substrate, from environmental factors, such as abrasion and ultraviolet radiation. The sheet 108 comprises a substrate, preferably of a polycarbonate resin.

The exterior panel assembly comprises a housing structure 116 to accommodate a heating device 118 with an emitter directed towards the sheet 108. The housing structure 116 comprises a perpendicular wall 126 that extends from the sheet in a perpendicular fashion. FIG. 2 shows that the sheet 108 is adjacent to the housing structure 116. i.e. the sheet 108 closes the opening 128 of the housing structure 116. In other words, the housing structure 116 opens up towards the sheet 108, and is adjacent to the sheet 108, such that the sheet 108 closes the formed opening 128. The assembly further comprises a carrier structure 112 comprising a base 110 and a peripheral upstanding wall 120, or spacing structure, that extends from the base 110 towards the sheet 108. The peripheral wall or spacing structure 120 connects with the sheet 108 at or near its side edges. Viewed from the sheet 108, the carrier structure 112 and the housing structure are provided behind the sheet 108. The peripheral upstanding wall 120 spaces the base 110 from the sheet 108. The sheet 108 and the carrier structure 112 together enclose a space 122.

The base 110 and the peripheral wall 120 may be connected by a smoothly curved transition region 113 towards the side edge of the sheet 108. Alternatively, the spacing structure or upstanding wall may extend substantially perpendicular from the base 110 towards the sheet 108. The housing structure 116 extends through the base 110 to the sheet 108 and is enclosed by the carrier structure 112.

The housing structure may comprises a further device 130, which is a safety device such as a sensor or a LiDAR component, or a light module.

The sheet 108 may have a pattern that is formed with a foil with a pre-fabricated pattern made of translucent and opaque regions, and may include a peripheral opaque border at the side edges of the sheet 108. In addition or alternatively, the sheet 108 may have a pattern layer made up with opaque lines and/or borders, thus forming an opaque portion and a translucent or transparent portion. The base 110 may be corrugated with zigzag waves or any other corrugation wave. A corrugated base adds a 3D effect to the exterior panel assembly, in particular if the pattern is provided on the sheet. An inner surface 114 of the base 110 may be provided with a foil, a mirror, a screen print or any other surface enhancing layer to optimize the 3D effect. Additionally, or alternatively, the inner surface 114 may be laser marked to include color change due to chemical/molecular alteration, charring, foaming, melting, ablation, and more. This laser marking adds to the 3D effect of the spacing between the sheet and the base of the carrier structure.

Between the base and the sheet, the front-end panel assembly may further comprise a light module 124 for highlighting the pattern and the 3D effect of the front-end panel assembly. The light module 124 may also be used for design purposes, such as brand identity or for a welcoming signal to a driver of a vehicle.

Figure 3A:
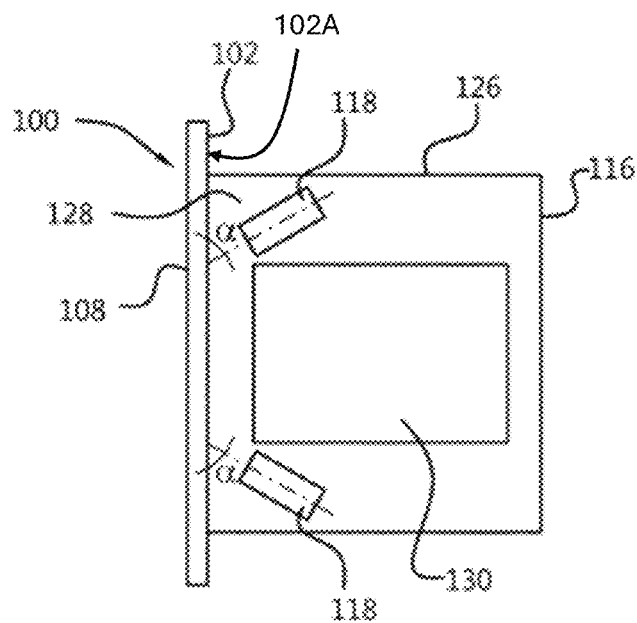
FIG. 3 shows an example of the interior of an exterior panel assembly, in top view and front view.

FIG. 3 shows the housing structure 116 with the heating device 118 and the further device 130 in detail, but schematic. The housing structure 116 of FIG. 3 houses a plurality of heating devices 118 and a further device 130. The heating devices 118 are directed at an angle α with a normal of the sheet. The angle α may be larger than 0 degrees and smaller than 180 degrees, preferably have an angle with the surface of the sheet of 0 degrees up to 90 degrees, i.e. in a perpendicular fashion. Preferably, the angle between the direction of emittance and the sheet surface is between more than 0 degrees and 50 degrees, or from 10 degrees to 30 degrees, or from 40 degrees to less than 90 degrees. The angle α in FIG. 3A may be around 40 to 50 degrees.

Each heating device may be angled towards the sheet 108 at a different angle, but every heating device at the same angle would be possible, too.

Figure 3B:
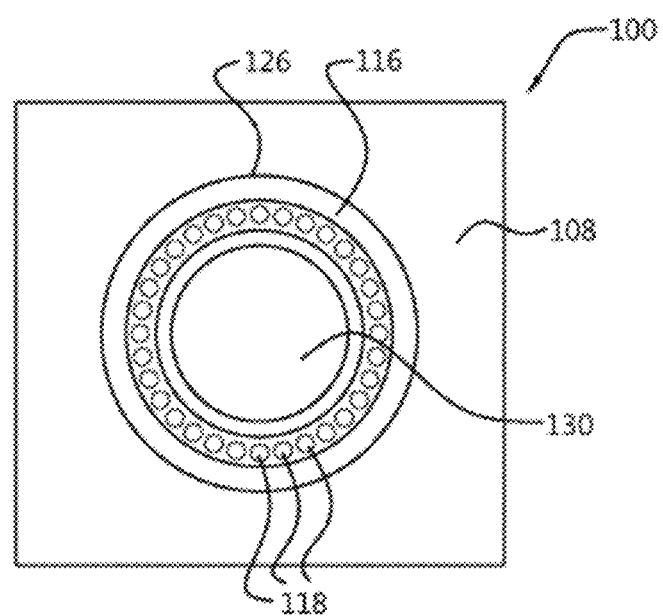

FIG. 3B shows that the plurality of heating devices 118 are distributed around the other device 130 as a ring shape. The opening 128 of the housing structure 116 may also be ring shaped. The housing structure 116 may have a cylindrical shape or any other desired shape, fitting with the carrier structure 112 and/or the exterior panel assembly 100. FIG. 3A shows that the heating device 118 is directed towards a first surface 102 of the sheet 108. The sheet 108 extends over the opening 108, but is not adjacent to the housing structure 116 in FIG. 3A, i.e. the sheet 108 is in the vicinity or near the housing structure.

LIST OF ITEMS

- 100. Exterior panel assembly
- 108. Sheet
- 110. Base
- 112. Carrier structure
- 113. Transition region
- 114. Inner surface
- 116. Housing structure
- 118. Heating device
- 120. Wall or spacing structure
- 122. Space
- 124. Light module
- 126. Perpendicular wall
- 128. Opening
- 130. Device
- 300. Vehicle
- 302. Head lights
- 304. Front fascia
- 306. Bumper assembly
- 308. Hood

The invention claimed is:

1. An exterior front-end panel assembly of a front facia of a vehicle,
    the assembly comprising:
    a front sheet at a front of the panel assembly, the front sheet having side edges, a first surface and a second surface opposite to each other, and comprising a thermoplastic material, wherein the front sheet has a first portion that is translucent to electromagnetic radiation in at least one of the ranges for radio waves, infrared radiation, visible light and ultraviolet radiation,
    a housing located behind a first portion of the front sheet, the housing defining an opening that opens toward the first portion of the front sheet, wherein the first portion of the front sheet extends over the opening of the housing;
    a safety device within the housing, wherein the safety device is LIDAR that emits light pulses toward the opening of the housing;
    the front sheet has a specific wavelength band ($\Delta$) within the near infrared band above 1600 nm to 2000 nm, wherein:
    the front sheet thickness is 1 mm and visible light transmission through the front sheet is equal to or lower than 50%,
    the front sheet thickness is 2 mm and visible light transmission through the front sheet is equal to or lower than 30%,
    the front sheet thickness is 3 mm and visible light transmission through the front sheet is equal to or lower than 20%, or
    the front sheet thickness is 4 mm and visible light transmission through the front sheet is equal to or lower than 10%;
    a plurality of heating devices, separate from the safety device and disposed in the housing, the heating devices consisting of infrared emitters, that are IR LEDs or IR Lasers, configured to emit infrared rays towards the opening of the housing with wavelengths within the specific wavelength band ($\Delta$) of the thermoplastic material such that a wavelength range of each of the infrared emitters matches a wavelength corresponding to lowest near infrared transmission of the front sheet,
    wherein the heating devices are distributed around the safety device as a ring shape.

2. The assembly according to claim 1, wherein the front sheet comprises at least one of the following materials:
    Polycarbonate with the lowest near infrared transmission at 1670 nm,
    Polypropylene compound with the lowest near infrared transmission at 1730 nm,
    Polymethyl Methacrylate with the lowest near infrared transmission at 1760 nm, or/and
    Polyvinyl butyral with the lowest near infrared transmission at 1800 nm.

3. The assembly according to claim 1, comprising
    a carrier structure with a base and a spacing structure to space apart the front sheet and the base, wherein the first surface of the front sheet faces away from the base.

4. The assembly according to claim 3, wherein the housing structure forms part of the carrier structure, and extends from the carrier structure towards the front sheet.

5. The assembly according to claim 1, wherein the front sheet is adjacent the opening of the housing structure, such that the front sheet closes the opening of the housing structure.

6. The assembly according to claim 1, wherein the housing structure forms a device-accommodating portion that allows the heating devices to be integrated into the assembly.

7. The assembly according to claim 1, wherein:
    the housing structure defines a further device-accommodating portion for integrating the safety device into the assembly and/or wherein the housing structure integrates further devices into the assembly.

8. The assembly according to claim 1, wherein
    an emitting direction of the heating device is perpendicular to the front sheet.

9. The assembly according to claim 1, wherein the front sheet comprises a thermoplastic substrate and a protective layer.

10. The assembly according to claim 1, wherein the front sheet further comprises a hardcoat layer on the first surface.

11. The assembly according to claim 1, wherein the front sheet comprises a first portion having a visible light transmission that is equal to or greater than 40%, measured in accordance with ASTM D1003-00.

12. The assembly according to claim 11, wherein the front sheet comprises a second portion, having a visible light transmission of the second portion is less than 40%, measured in accordance with ASTM D1003-00.

13. A vehicle comprising:
    a pair of headlights;
    a hood;
    a bumper assembly;
    an exterior front-end panel assembly of a front facia of the vehicle, wherein the panel assembly is located between the pair of headlights, the hood, and bumper assembly, the panel assembly comprising:
    a front sheet at a front of the panel assembly, the front sheet having side edges, a first surface and a second surface opposite to each other, and comprising a thermoplastic material, wherein the front sheet has a first portion that is translucent to electromagnetic radiation in at least one of the ranges for radio waves, infrared radiation, visible light and ultraviolet radiation,
    a housing located behind a first portion of the front sheet, the housing defining an opening that opens toward the first portion of the front sheet, wherein the first portion of the front sheet extends over the opening of the housing;

a safety device within the housing, wherein the safety device is LIDAR that emits light pulses toward the opening of the housing;

the front sheet has a specific wavelength band (Δ) within the near infrared band above 1600 nm to 2000 nm, wherein:

the front sheet thickness is 1 mm and visible light transmission through the front sheet is equal to or lower than 50%, the front sheet thickness is 2 mm and visible light transmission through the front sheet is equal to or lower than 30%, the front sheet thickness is 3 mm and visible light transmission through the front sheet is equal to or lower than 20%, or the front sheet thickness is 4 mm and visible light transmission through the front sheet is equal to or lower than 10%;

a plurality of heating devices, separate from the safety device and disposed in the housing, the heating devices consisting of infrared emitters, that are IR LEDs or IR Lasers, configured to emit infrared rays towards the opening of the housing with wavelengths within the specific wavelength band (Δ) of the thermoplastic material such that a wavelength range of each of the infrared emitters matches a wavelength corresponding to lowest near infrared transmission of the front sheet, wherein the heating devices are distributed around the safety device as a ring shape.

14. The vehicle according to claim 13, wherein the exterior panel assembly forms part of the front fascia of the vehicle.

15. The vehicle of claim 14, wherein the front sheet comprises at least one of the following materials:

Polycarbonate with the lowest near infrared transmission at 1670 nm,

Polypropylene compound with the lowest near infrared transmission at 1730 nm,

Polymethyl Methacrylate with the lowest near infrared transmission at 1760 nm, or/and Polyvinyl Butyral with the lowest near infrared transmission at 1800 nm.

16. The vehicle of claim 14, comprising a carrier structure with a base and a spacing structure to space apart the front sheet and the base, wherein the first surface of the front sheet faces away from the base.

17. The vehicle of claim 16, wherein the housing structure forms part of the carrier structure, and extends from the carrier structure towards the front sheet.

18. The vehicle of claim 14, wherein the front sheet is adjacent the opening of the housing structure, such that the front sheet closes the opening of the housing structure.

19. The vehicle of claim 14, wherein the housing structure forms a device-accommodating portion that allows the heating device to be integrated into the assembly.

\* \* \* \* \*